US008482172B2

(12) United States Patent
Sasaki et al.

(10) Patent No.: US 8,482,172 B2
(45) Date of Patent: Jul. 9, 2013

(54) TERMINAL MODULE FOR ROTATING ELECTRIC MACHINE HAVING A GUIDE PORTION, ROTATING ELECTRIC MACHINE, AND MANUFACTURING METHOD THEREOF

(75) Inventors: Kei Sasaki, Nagoya (JP); Yasumasa Goto, Gamagouri (JP); Norihiko Akao, Nissin (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 13/479,868

(22) Filed: May 24, 2012

(65) Prior Publication Data

US 2012/0235524 A1    Sep. 20, 2012

Related U.S. Application Data

(62) Division of application No. 12/600,955, filed on Nov. 19, 2009.

(60) Provisional application No. PCT/JP2008/060254, filed on May 28, 2008.

(30) Foreign Application Priority Data

May 29, 2007  (JP) ................................. 2007-141912

(51) Int. Cl.
    *H02K 3/50* (2006.01)
(52) U.S. Cl.
    USPC .................. 310/71; 310/180; 310/43; 310/45

(58) Field of Classification Search
    USPC ................................ 310/71, 179, 180, 43, 45
    See application file for complete search history.

(56) References Cited

U.S. PATENT DOCUMENTS

| 5,823,797 | A | * | 10/1998 | Sugiyama ...................... 29/883 |
| 6,369,473 | B1 | | 4/2002 | Baumeister et al. |
| 6,566,779 | B2 | | 5/2003 | Takano et al. |
| 6,674,195 | B2 | | 1/2004 | Yagyu et al. |
| 7,193,345 | B2 | | 3/2007 | Shinzaki et al. |
| 7,219,417 | B2 | * | 5/2007 | Kobayashi et al. ............. 310/71 |
| 7,385,323 | B2 | | 6/2008 | Takahashi et al. |
| 2002/0047365 | A1 | | 4/2002 | Yagyu et al. |

(Continued)

FOREIGN PATENT DOCUMENTS

| CN | 1414672 A | 4/2003 |
| CN | 1551451 A | 12/2004 |

(Continued)

OTHER PUBLICATIONS

German Office Action corresponding to German Patent Application No. 11 2008 001 219.9 dated Sep. 5, 2011.

(Continued)

*Primary Examiner* — Tran Nguyen
*Assistant Examiner* — Michael Andrews
(74) *Attorney, Agent, or Firm* — Sughrue Mion, PLLC

(57) ABSTRACT

A terminal module includes a ring-shaped rail having a groove extending in a circumferential direction, a bus bar fitted into the groove, and a connector portion having a connector terminal connecting the bus bar with an external wire. The rail has a phase determining hole for determining a phase of rotation of the rail about an axial direction.

4 Claims, 10 Drawing Sheets

U.S. PATENT DOCUMENTS

| | | | |
|---|---|---|---|
| 2003/0146671 A1* | 8/2003 | Diehl et al. | 310/71 |
| 2003/0173842 A1 | 9/2003 | Kobayashi et al. | |
| 2004/0256936 A1 | 12/2004 | Takahashi et al. | |
| 2007/0076354 A1 | 4/2007 | Kato et al. | |
| 2008/0175732 A1* | 7/2008 | Sakata | 310/254 |

FOREIGN PATENT DOCUMENTS

| | | |
|---|---|---|
| DE | 1050948 A2 | 11/2000 |
| DE | 10103824 A1 | 9/2002 |
| DE | 103 18 816 A1 | 11/2004 |
| DE | 60119051 T2 | 12/2006 |
| JP | 2001-136698 | 5/2001 |
| JP | 2003-134724 | 5/2003 |
| JP | 2004-88944 | 3/2004 |
| JP | 2004-336897 | 11/2004 |
| JP | 2005-65374 | 3/2005 |
| JP | 2005-168224 A | 6/2005 |
| JP | 2006-180615 | 7/2006 |
| JP | 2007-049823 A | 2/2007 |
| JP | 2007-104812 | 4/2007 |
| WO | 2004/010562 | 1/2004 |

OTHER PUBLICATIONS

German Office Action corresponding to German Patent Application No. 11 2008 001 219.9 dated Sep. 1, 2011.

Chinese Office Action for corresponding CN Patent Application No. 200880017217.6 mailed Nov. 8, 2011.

United States Office Action issued Jun. 21, 2012 for U.S. Appl. No. 12/600,955.

United States Office Action dated Oct. 25, 2012 for related U.S. Appl. No. 12/600,955.

Notice of Allowance dated Mar. 27, 2013 for U.S. Appl. No. 12/600,955.

* cited by examiner

TERMINAL MODULE FOR ROTATING ELECTRIC MACHINE HAVING A GUIDE PORTION, ROTATING ELECTRIC MACHINE, AND MANUFACTURING METHOD THEREOF

CROSS REFERENCE TO RELATED APPLICATIONS

This is a Divisional of application Ser. No. 12/600,955 filed on Nov. 19, 2009, which is a National Stage Entry of PCT Application No. PCT/JP2008/060254, filed on May 28, 2008, which claims priority from Japanese Patent Application 2007-141912 filed on May 29, 2007. The entire disclosures of all the prior applications are considered part of the disclosure of the accompanying divisional application and are hereby incorporated by reference in their entirety.

TECHNICAL FIELD

The present invention relates to a terminal module for a rotating electric machine, a rotating electric machine, and a manufacturing method thereof. In particular, the present invention relates to a terminal module for a rotating electric machine having a bus bar, a rotating electric machine having the terminal module, and a manufacturing method thereof.

BACKGROUND ART

Conventionally, a ring-shaped bus bar has been provided on an axial end surface of a cylindrical stator core. Such a bus bar is described, for example, in Japanese Patent Laying-Open Nos. 2006-180615 (Patent Document 1), 2005-65374 (Patent Document 2), 2003-134724 (Patent Document 3), and International Publication No. WO04/010562 (Patent Document 4).

Further, Japanese Patent Laying-Open No. 2004-336897 (Patent Document 5) discloses an armature of a rotating electric machine having position determining means defining a position of a wiring substrate with respect to an insulator.

In order to reduce manufacturing cost of a rotating electric machine and allow for mass production thereof, it is desirable to automatically mount a terminal module including a bus bar.

There has been a problem that, in the structures described in Patent Documents 1 to 4, it is difficult to automatically determine a phase of rotation of a bus bar about an axial direction, a position of a mold for a mold resin, and the like, and it is difficult to automatically mount a terminal module.

DISCLOSURE OF THE INVENTION

One object of the present invention is to provide a terminal module for a rotating electric machine capable of reducing manufacturing cost of the rotating electric machine and adaptable to mass production, a rotating electric machine having the terminal module, and a manufacturing method thereof.

A terminal module for a rotating electric machine in accordance with the present invention is a terminal module for a rotating electric machine mounted on an end surface in an axial direction of a stator of the rotating electric machine.

In one aspect, the terminal module for a rotating electric machine described above includes a ring-shaped bus bar housing having a groove extending in a circumferential direction, and a bus bar fitted into the groove. The bus bar housing has a guide portion for determining a phase of rotation of the bus bar housing about the axial direction.

According to the configuration described above, the phase of rotation of the bus bar housing can be determined by fitting a guide pin into the guide portion, and thus the terminal module can be automatically mounted to the stator. As a result, manufacturing cost of the rotating electric machine can be reduced, and mass production can be performed.

Preferably, in the terminal module for a rotating electric machine described above, the bus bar includes a plurality of members arranged in a radial direction of the bus bar housing, and the guide portion is provided at a position where all of the plurality of members arranged in the radial direction of the bus bar housing are divided in the circumferential direction of the bus bar housing.

According to the configuration described above, the guide portion can be formed effectively using a space in the bus bar housing where the bus bar is not formed. Thereby, the terminal module can be automatically mounted to the stator without inhibiting size reduction of the terminal module.

As an example, in the terminal module for a rotating electric machine described above, the bus bar includes a plurality of members configuring neutral points of the rotating electric machine, and the guide portion is provided between the plurality of members configuring the neutral points.

In another aspect, the terminal module for a rotating electric machine described above includes a ring-shaped bus bar housing having a groove extending in a circumferential direction, a bus bar fitted into the groove, and a connector portion having a terminal connecting the bus bar with an external wire. The connector portion has a guide portion for determining a position of a mold for a mold resin portion molding the bus bar housing.

According to the configuration described above, the position of the mold can be determined by fitting a guide pin into the guide portion, and thus the mold can be automatically mounted. As a result, manufacturing cost of the rotating electric machine can be reduced, and mass production can be performed.

A rotating electric machine in accordance with the present invention includes a stator core having a tooth, an insulator fitted to the tooth, a stator coil wound around the insulator, and the terminal module for the rotating electric machine described above. The insulator has an engaging portion engaging the terminal module for the rotating electric machine.

According to the configuration described above, engagement between the insulator and the terminal module for the rotating electric machine can secure the insulator and the stator coil wound around the insulator.

In one aspect, a method of manufacturing a rotating electric machine in accordance with the present invention includes the steps of holding a ring-shaped terminal module for the rotating electric machine by a holder while determining a phase of rotation of the terminal module about an axial direction by fitting a guide pin into a guide portion formed in the terminal module, and mounting the terminal module held by the holder to a stator core.

According to the method described above, the terminal module can be automatically mounted to the stator core by determining the phase of rotation of the terminal module about the axial direction using the guide portion. As a result, manufacturing cost of the rotating electric machine can be reduced, and mass production can be performed.

In another aspect, a method of manufacturing a rotating electric machine in accordance with the present invention includes the steps of holding a ring-shaped terminal module for the rotating electric machine by a holder, mounting the terminal module held by the holder to a stator core, and determining a position of a mold for resin molding by fitting a guide pin into a guide portion formed in the terminal module, and resin molding the terminal module mounted to the stator core using the mold.

According to the method described above, the mold can be automatically mounted by determining the position of the mold for resin molding using the guide portion. As a result, manufacturing cost of the rotating electric machine can be reduced, and mass production can be performed.

According to the present invention, manufacturing cost of the rotating electric machine can be reduced, and mass production can be performed, as described above.

It is to be noted that two or more of the configurations described above may be combined as appropriate.

BEST MODES FOR CARRYING OUT THE INVENTION

Figure 1:
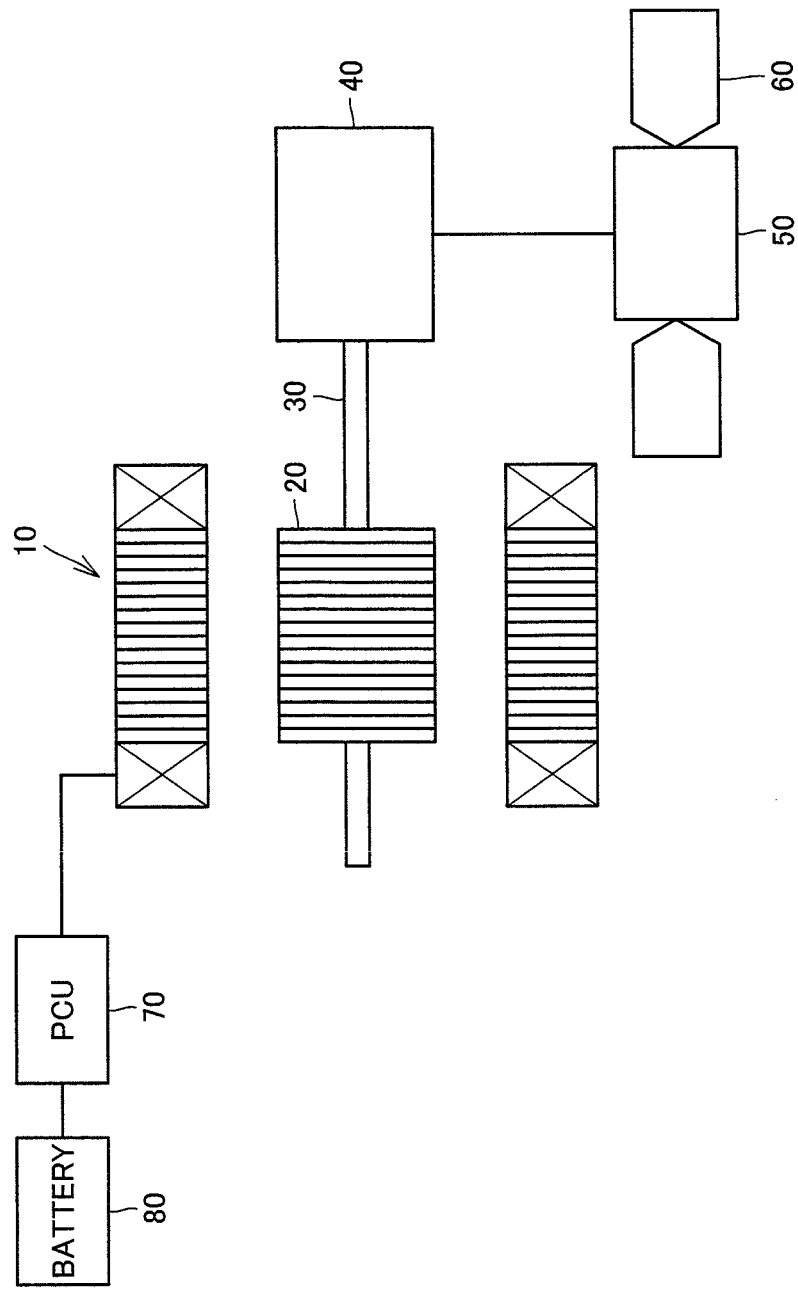
FIG. 1 is a view schematically showing a configuration of an electric driven vehicle including a terminal module for a rotating electric machine in accordance with one embodiment of the present invention.

Hereinafter, an embodiment of the present invention will be described. It is to be noted that identical or corresponding parts will be designated by the same reference numerals, and the description thereof may not be repeated.

When a number, amount, or the like is referred to in the embodiment described below, the scope of the present invention is not necessarily limited to such a number, amount, or the like, unless otherwise specified. Further, each component in the embodiment described below is not necessarily essential to the present invention, unless otherwise specified. Furthermore, if there are a plurality of embodiments below, it is initially intended to combine features of the embodiments as appropriate, unless otherwise specified.

FIG. 1 is a view showing a hybrid vehicle (HV) including a terminal module for a rotating electric machine in accordance with one embodiment of the present invention.

In the present specification, an "electric driven vehicle" is not limited to a hybrid vehicle, and also includes, for example, a fuel cell car and an electric car.

Referring to FIG. 1, the hybrid vehicle is configured to include a stator 10, a rotor 20, a shaft 30, a reduction mechanism 40, a differential mechanism 50, a drive shaft receiving portion 60, a PCU (Power Control Unit) 70, and a battery 80 as a chargeable/dischargeable secondary battery.

Stator 10 and rotor 20 configure a rotating electric machine (i.e., motor generator) having a function as an electric motor or an electric power generator. Rotor 20 is mounted to shaft 30. Shaft 30 is rotatably supported by a housing for a drive unit via a bearing.

Stator 10 has a ring-shaped stator core. The stator core is configured by stacking plate-like magnetic bodies such as iron, iron alloy, or the like. The stator core has an inner circumference surface having a plurality of stator teeth and a slot as a recess formed between the stator teeth. The slot is provided to be open toward the inner circumference of the stator core.

Stator coils including an U phase, a V phase, and a W phase as three winding phases are wound around the teeth to fit into the slot. The U phase, the V phase, and the W phase are wound such that they are displaced from one another on the circumference. The stator coils are connected to PCU 70 via a power supply cable. PCU 70 is electrically connected to battery 80 via a power supply cable. Thereby, battery 80 and the stator coils are electrically connected.

Motive power output from the motor generator including stator 10 and rotor 20 is transmitted from reduction mechanism 40 to drive shaft receiving portion 60, via differential mechanism 50. Drive power transmitted to drive shaft receiving portion 60 is transmitted as rotary force to wheels (not shown) via a drive shaft (not shown) to allow the vehicle to run.

In contrast, during regenerative breaking of the hybrid vehicle, the wheels are rotated by inertial force of a vehicle body. The motor generator is driven by the rotary force from the wheels, via drive shaft receiving portion 60, differential mechanism 50, and reduction mechanism 40. On this occasion, the motor generator operates as an electric power generator. Electric power generated by the motor generator is stored in battery 80, via an inverter within PCU 70.

Figure 2:
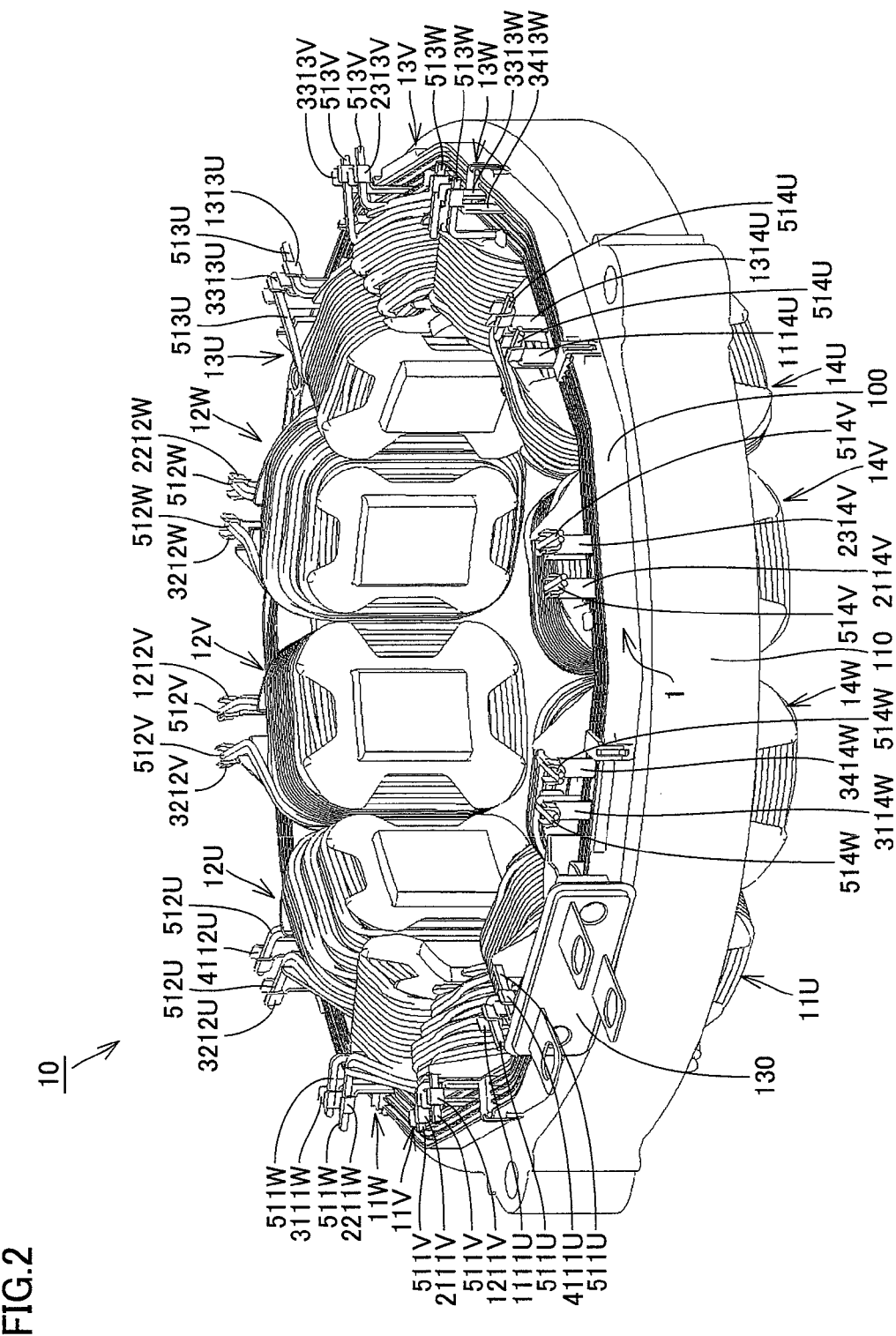
FIG. 2 is a perspective view showing a stator including a terminal module for a rotating electric machine in accordance with one embodiment of the present invention.
Figure 3:
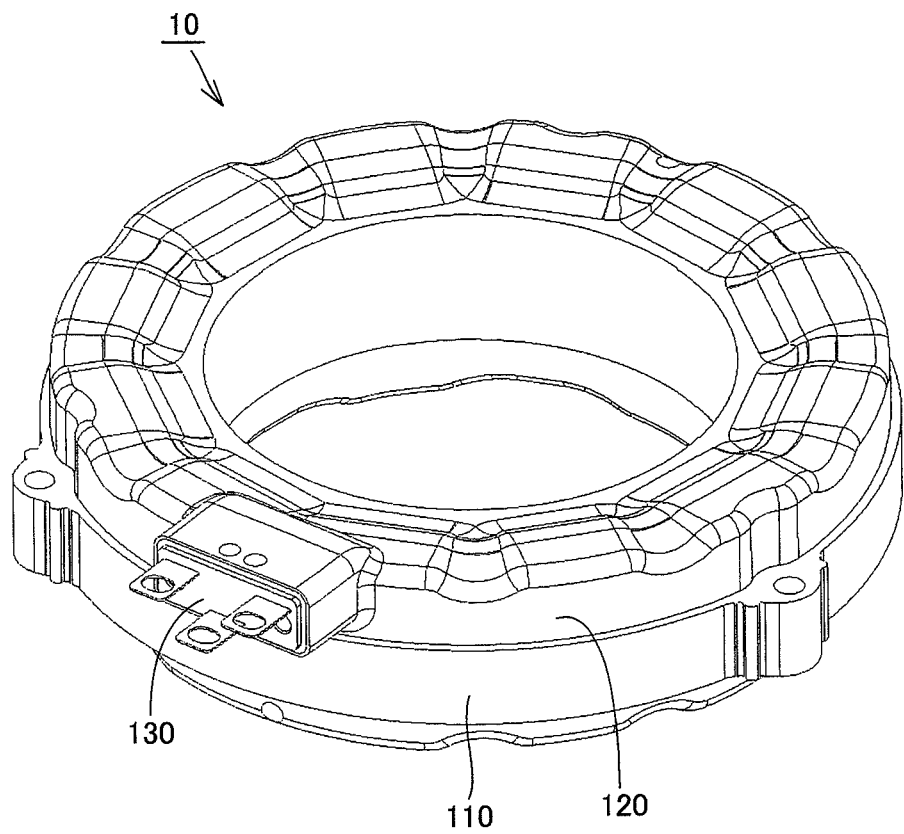
FIG. 3 is a view showing a state where a mold resin portion is provided to the stator shown in FIG. 2.
Figure 4:
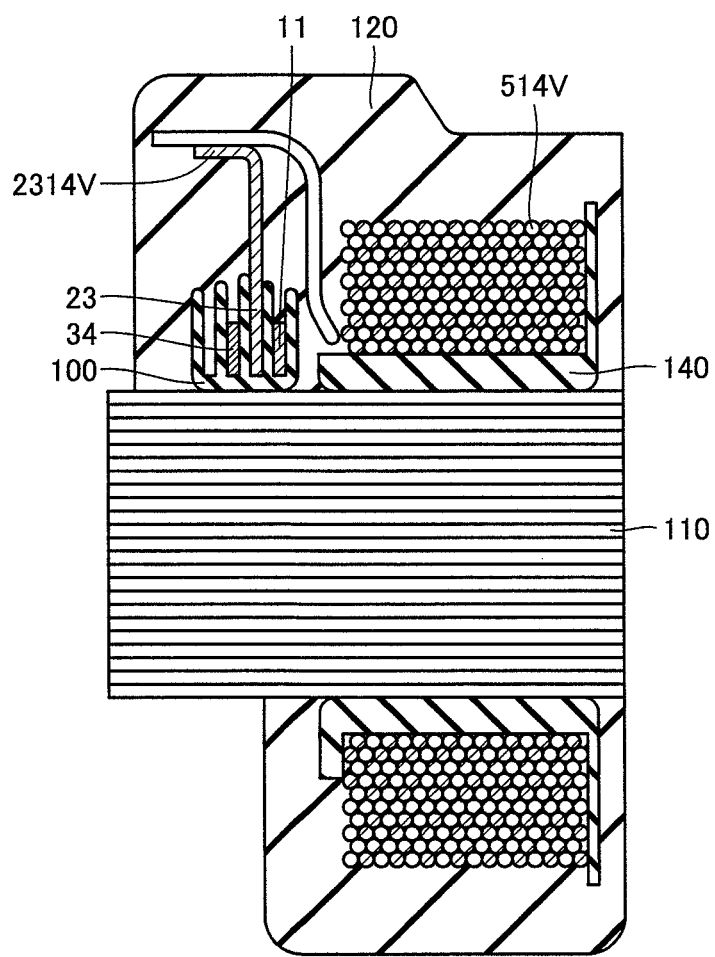
FIG. 4 is a cross sectional view of the stator shown in FIG. 3.

FIGS. 2 and 3 are perspective views showing stator 10 (FIG. 2: before forming a mold resin, FIG. 3: after forming the mold resin), and FIG. 4 is a cross sectional view of stator 10. Referring to FIGS. 2 to 4, stator 10 is configured to include a stator core 110, stator coils, bus bars to which the stator coils are connected, a terminal module 1 to which the bus bars are attached, a mold resin portion 120, a connector portion 130, and an insulator 140.

As shown in FIG. 2, the stator coils include first to fourth U-phase coils 11U to 14U, first to fourth V-phase coils 11V to 14V, and first to fourth W-phase coils 11W to 14W.

The first U-phase coil 11U is formed by winding a conductive wire 511U around a tooth. Conductive wire 511U has one end connected to a first U-phase coil terminal 4111U, and the other end connected to a first U-phase coil terminal 1111U.

The first V-phase coil 11V is formed by winding a conductive wire 511V around a tooth. Conductive wire 511V has one end connected to a first V-phase coil terminal 1211V, and the other end connected to a first V-phase coil terminal 2111V.

The first W-phase coil 11W is formed by winding a conductive wire 511W around a tooth. Conductive wire 511W has one end connected to a first W-phase coil terminal 2211W, and the other end connected to a first W-phase coil terminal 3111W. The second U-phase coil 12U is formed by winding a conductive wire 512U around a tooth. Conductive wire 512U has one end connected to a second U-phase coil terminal 3212U, and the other end connected to a second U-phase coil terminal 4112U.

The second V-phase coil 12V is formed by winding a conductive wire 512V around a tooth. Conductive wire 512V has one end connected to a second V-phase coil terminal 3212V, and the other end connected to a second V-phase coil terminal 1212V.

The second W-phase coil 12W is formed by winding a conductive wire 512W around a tooth. Conductive wire 512W has one end connected to a second W-phase coil terminal 3212W, and the other end connected to a second W-phase coil terminal 2212W.

The third U-phase coil 13U is formed by winding a conductive wire 513U around a tooth. Conductive wire 513U has one end connected to a third U-phase coil terminal 3313U, and the other end connected to a third U-phase coil terminal 1313U.

The third V-phase coil 13V is formed by winding a conductive wire 513V around a tooth. Conductive wire 513V has one end connected to a third V-phase coil terminal 3313V, and the other end connected to a third V-phase coil terminal 2313V.

The third W-phase coil 13W is formed by winding a conductive wire 513W around a tooth. Conductive wire 513W has one end connected to a third W-phase coil terminal 3313W, and the other end connected to a third W-phase coil terminal 3413W.

The fourth U-phase coil 14U is formed by winding a conductive wire 514U around a tooth. Conductive wire 514U has one end connected to a fourth U-phase coil terminal 1314U, and the other end connected to a fourth U-phase coil terminal 1114U.

The fourth V-phase coil 14V is formed by winding a conductive wire 514V around a tooth. Conductive wire 514V has one end connected to a fourth V-phase coil terminal 2314V, and the other end connected to a fourth V-phase coil terminal 2114V.

The fourth W-phase coil 14W is formed by winding a conductive wire 514W around a tooth. Conductive wire 514W has one end connected to a fourth W-phase coil terminal 3414W, and the other end connected to a fourth W-phase coil terminal 3114W.

As shown in FIGS. 2 and 4, each coil terminal is provided to protrude from a rail 100. The terminal has a recess for receiving each conductive wire to ensure connection between the conductive wire and the terminal. Each coil is wound around insulator 140 and formed as a cassette coil before being mounted to stator 110.

Referring to FIGS. 3 and 4, the rail and the coils provided on stator core 110 are molded by mold resin portion 120 made of a resin. Thereby, positions of the coils are reliably determined, and insulation between adjacent coils is ensured. It is to be noted that, as to molding using a resin as described above, the present invention is not limited to the formation of a molded body as shown in FIGS. 3 and 4, and the present invention may employ a configuration in which an insulating resin such as varnish is applied on surfaces of coils to ensure determination of positions of the coils.

Figure 5:
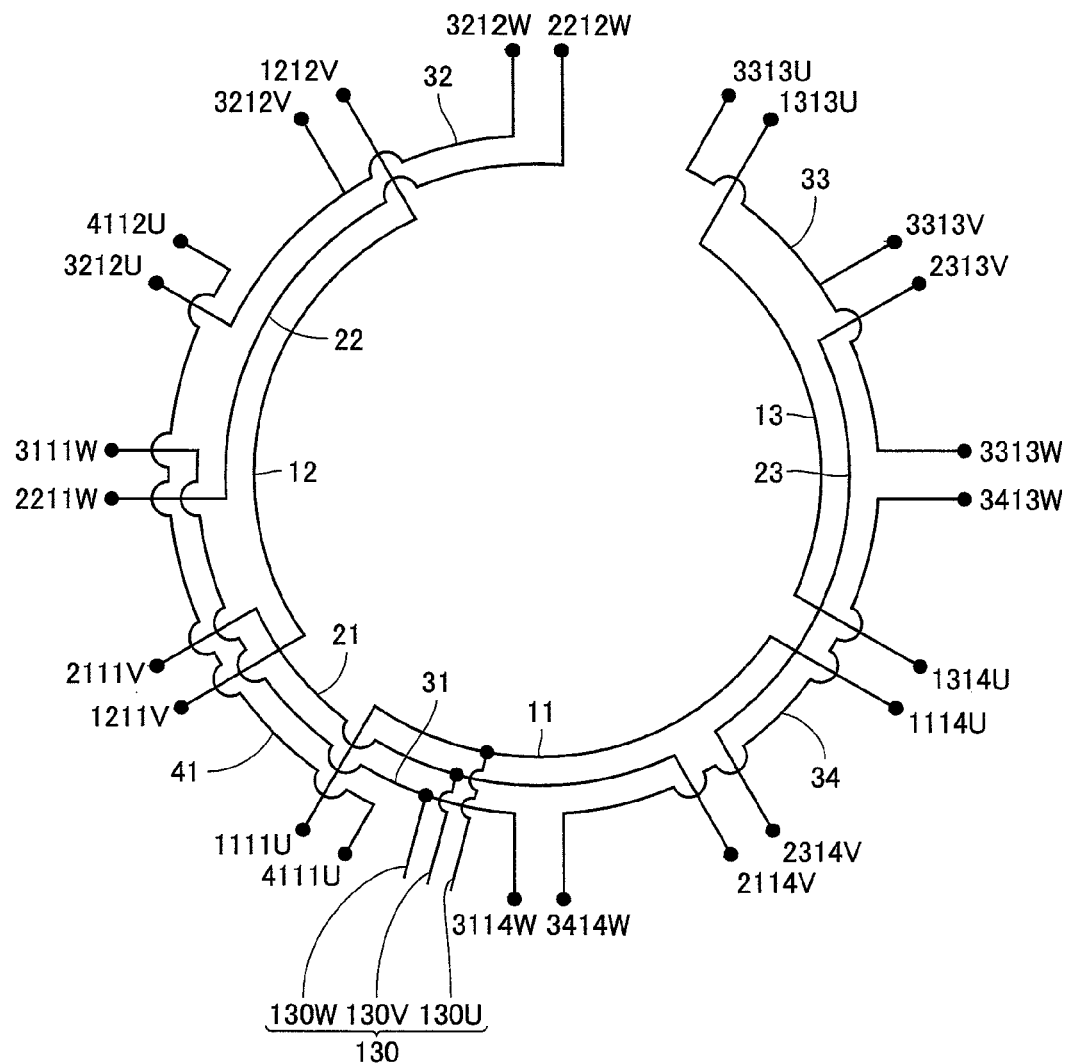
FIG. 5 is a view schematically showing a connection state of bus bars in the terminal module for a rotating electric machine shown in FIG. 2.
Figure 6:
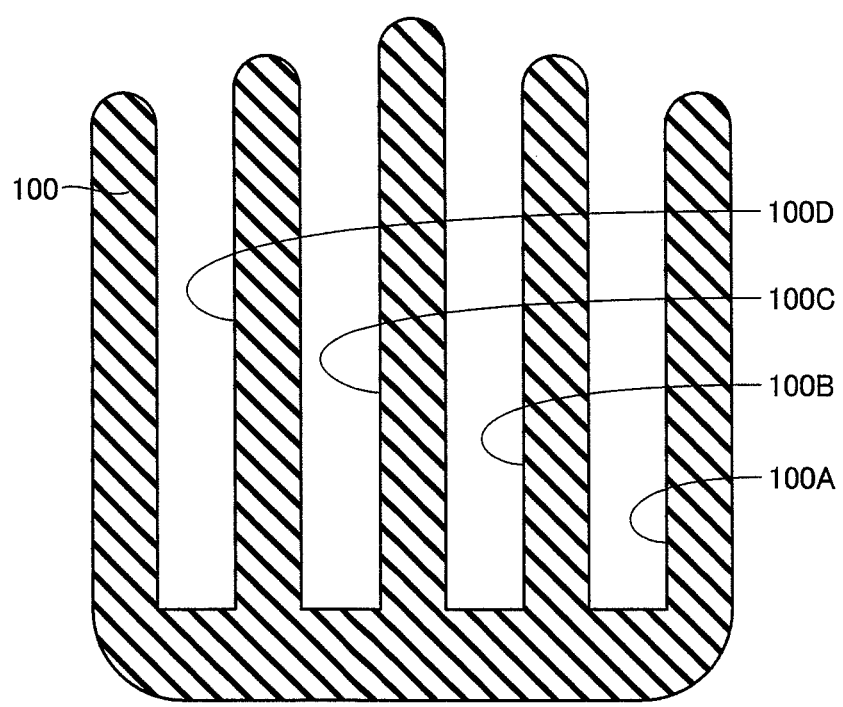
FIG. 6 is a cross sectional view showing a rail included in the terminal module for a rotating electric machine shown in FIG. 2.

FIG. 5 is a view schematically showing a connection state of bus bars in terminal module 1, and FIG. 6 is a cross sectional view showing rail 100 included in terminal module 1.

Referring to FIGS. 5 and 6, in rail 100, a plurality of grooves 100A, 100B, 100C, and 100D arranged from an inner circumference side to an outer circumference side of rail 100 are formed. Each of grooves 100A, 100B, 100C, and 100D has a shape interrupted in the course of its extension.

The bus bars include first bus bars 11 to 13, second bus bars 21 to 23, third bus bars 31 to 34, and a fourth bus bar 41.

The first bus bars 11, 12, and 13 are fitted into groove 100A. The first bus bar 11 is provided with the first U-phase coil terminal 1111U and the fourth U-phase coil terminal 1114U. Further, a connector terminal 130U is attached to the first bus bar 11. Electric power is supplied from connector terminal 130U, and the electric power is transmitted to the first bus bar 11. The first bus bar 12 is provided with the first V-phase coil terminal 1211V and the second V-phase coil terminal 1212V. The first bus bar 13 is provided with the third U-phase coil terminal 1313U and the fourth U-phase coil terminal 1314U.

The second bus bars 21, 22, and 23 are fitted into groove 100B. The second bus bar 21 is provided with the first V-phase coil terminal 2111V and the fourth V-phase coil terminal 2114V. Further, a connector terminal 130V is attached to the second bus bar 21. Electric power is supplied from connector terminal 130V, and the electric power is transmitted to the second bus bar 21. The second bus bar 22 is provided with the first W-phase coil terminal 2211W and the second W-phase coil terminal 2212W. The second bus bar 23 is provided with the third V-phase coil terminal 2313V and the fourth V-phase coil terminal 2314V.

The third bus bars 31, 32, 33, and 34 are fitted into groove 100C. The third bus bar 31 is provided with the fourth W-phase coil terminal 3114W and the first W-phase coil terminal 3111W. Further, a connector terminal 130W is attached to the third bus bar 31. Electric power is supplied from connector terminal 130W, and the electric power is transmitted to the third bus bar 31. The third bus bar 32 is provided with the second U-phase coil terminal 3212U, the second V-phase coil terminal 3212V, and the second W-phase coil terminal 3212W. The third bus bar 33 is provided with the third U-phase coil terminal 3313U, the third V-phase coil terminal 3313V, and the third W-phase coil terminal 3313W. The third bus bars 32 and 33 each serve as a neutral point connecting the U-phase coil, the V-phase coil, and the W-phase coil. The fourth bus bar 34 is provided with the third W-phase coil terminal 3413W and the fourth W-phase coil terminal 3414W.

The fourth bus bar 41 is fitted into groove 100D. The fourth bus bar 41 is provided with the first U-phase coil terminal 4111U and the second U-phase coil terminal 4112U.

Although FIG. 5 shows a star-connected three-phase alternating current motor, the present invention is not limited thereto, and the present invention may be applied to, for example, a delta-connected three-phase coil motor.

Figure 7:
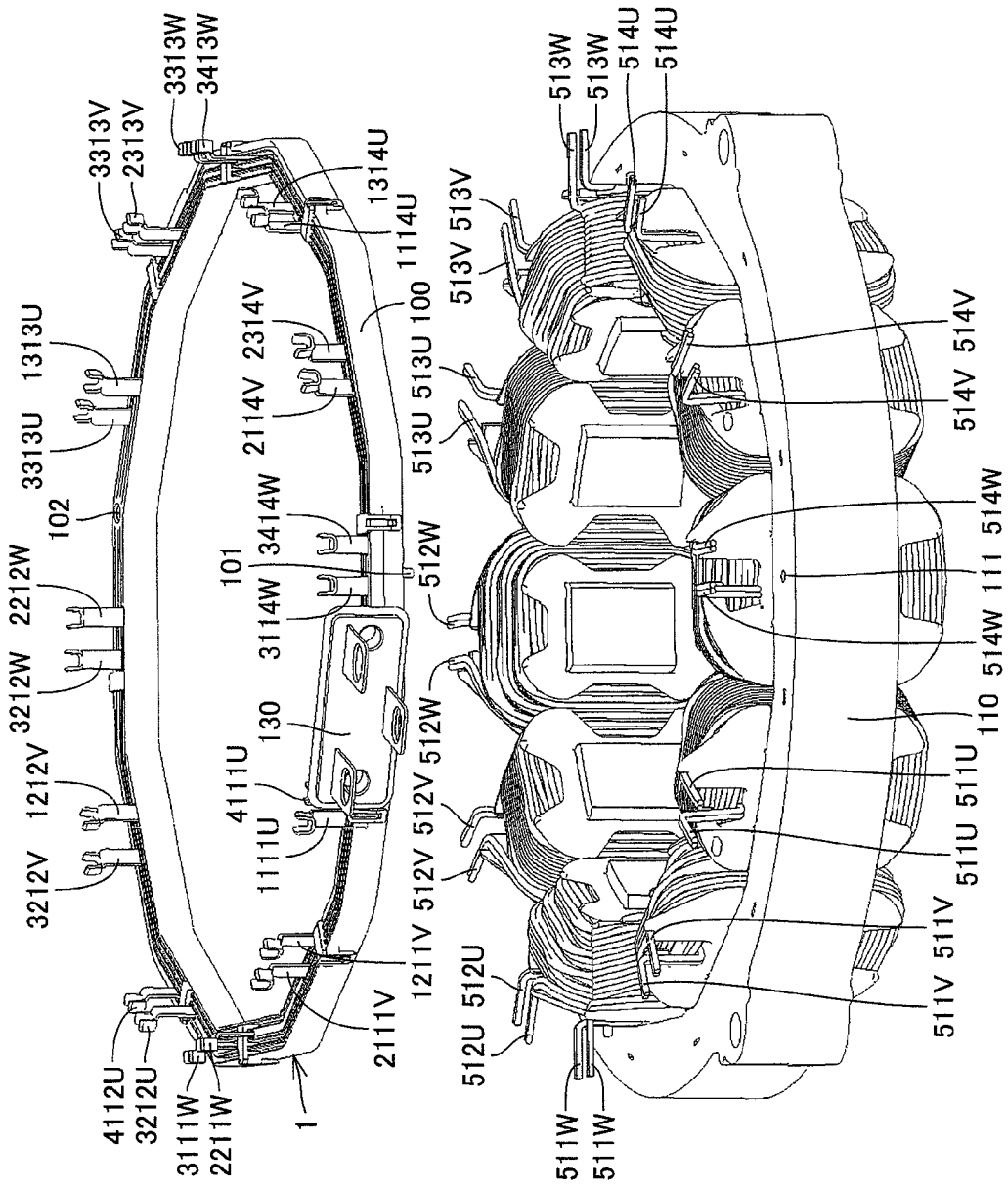
FIG. 7 is a view showing a process of mounting the terminal module for a rotating electric machine shown in FIG. 2 to the stator.

Next, a process of mounting terminal module 1 to stator 10 will be described using FIG. 7. Referring to FIG. 7, terminal module 1 has a position determining pin 101 and a position determining hole 102. Further, a position determining pin insertion hole 111 is formed in an axial end surface of stator core 110 at a location corresponding to position determining pin 101.

When terminal module 1 is placed on the axial end surface of stator core 110, position determining pin 101 is inserted into position determining pin insertion hole 111.

In the present embodiment, terminal module 1 is held by a holder, and is automatically mounted to stator core 110 in that state. Since phase determining hole 102 is formed in terminal module 1, a phase of rotation of terminal module 1 held by the holder is determined by inserting a guide pin secured on the holder into phase determining hole 102. This enables automatic mounting of terminal module 1.

Although FIG. 7 shows an example of mounting terminal module 1 to stator core 110 mounted with cassette coils, in a typical example, terminal module 1 is mounted to stator core 110, and then cassette coils are mounted to stator core 110.

Figure 8:
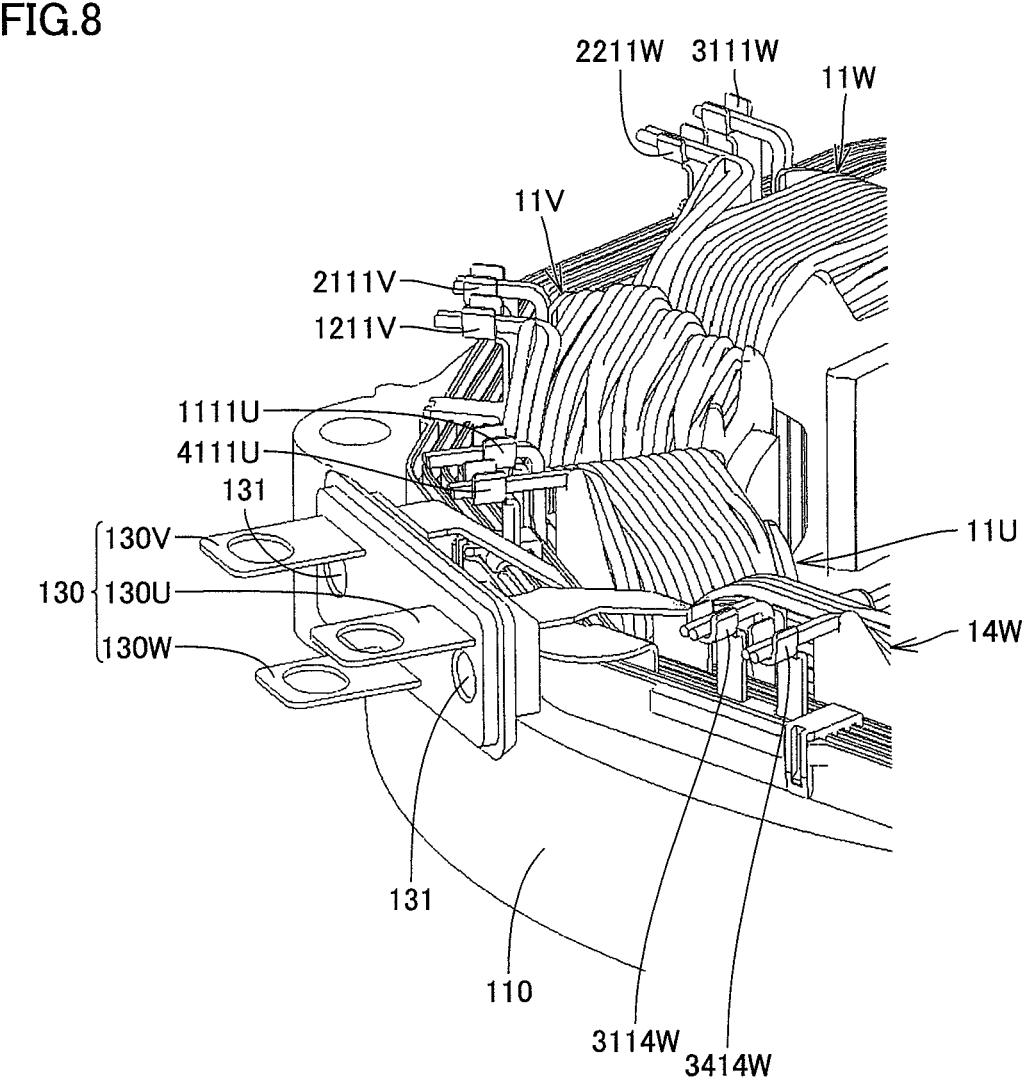
FIG. 8 is an enlarged view of the periphery of a connector portion in the stator shown in FIG. 2.

After terminal module 1 is mounted to stator core 110, mold resin portion 120 is formed using a mold. In the present embodiment, a position determining hole 131 is formed in connector portion 130 as shown in FIG. 8, and a position of the mold for mold resin portion 120 is determined by inserting a guide pin secured on the mold into position determining hole 131. This enables automatic mounting of the mold.

As described above, since terminal module 1 and the mold can be automatically mounted in the present embodiment, manufacturing cost of stator 10 can be reduced, and mass production can be performed.

Instead of phase determining hole 102 described above, a projection may be formed, and a recess engaging the projection may be provided at a tip end of the guide pin secured on the holder. Further, instead of position determining hole 131 described above, a projection may be formed, and a recess engaging the projection may be provided at a tip end of the guide pin secured on the mold.

Figure 9:
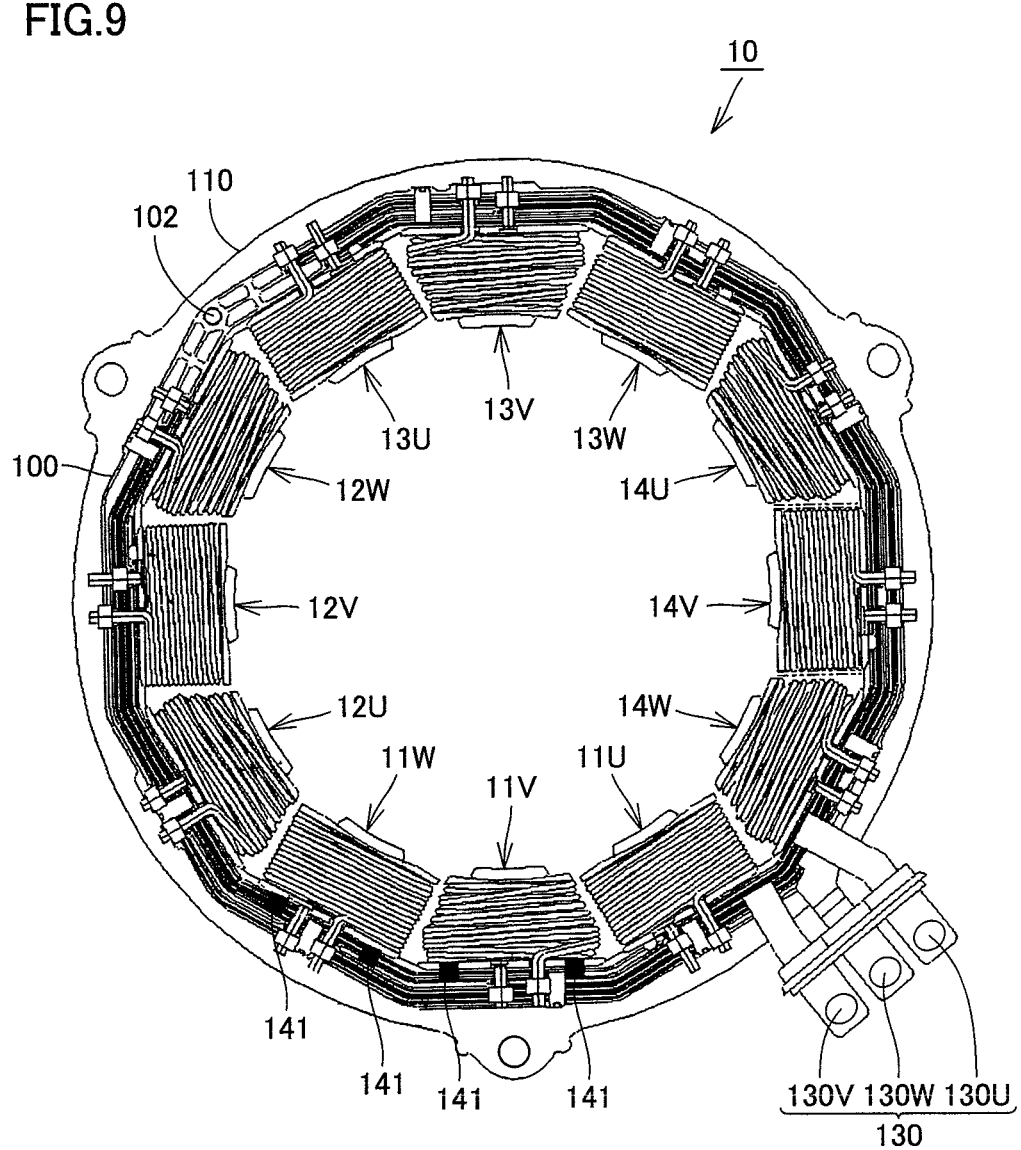
FIG. 9 is a top view showing a modification of the stator including a terminal module for a rotating electric machine in accordance with one embodiment of the present invention.
Figure 10:
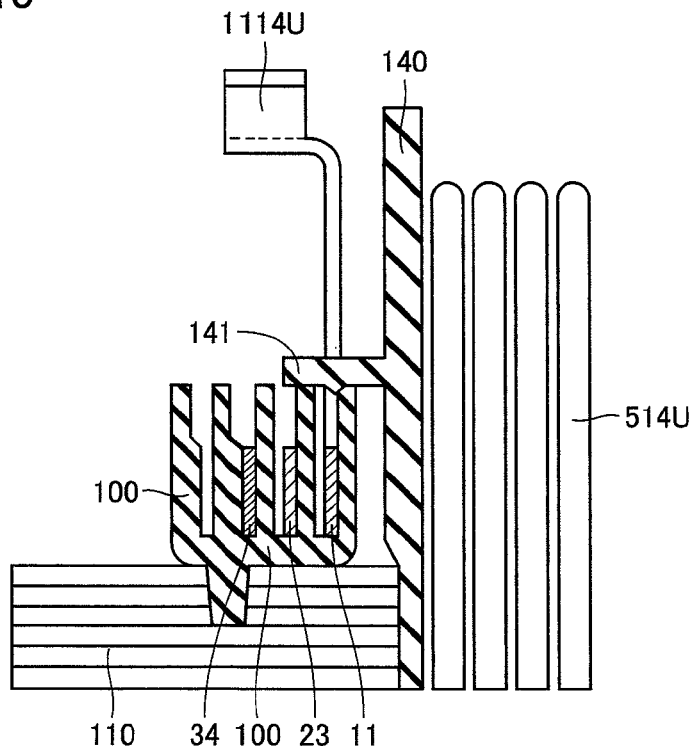
FIG. 10 is a cross sectional view of the stator shown in FIG. 9.

FIG. 9 is a top view showing a modification of stator 10, and FIG. 10 is a cross sectional view of stator 10 shown in FIG. 9. Referring to FIGS. 9 and 10, in the present modification, a protruding portion 141 protruding from a back surface of insulator 140 to radially outward of stator 10 is provided, and protruding portion 141 engages rail 100 in terminal module 1. Thereby, insulator 140 and the stator coils wound around insulator 140 can be secured.

In a case where insulator 140 does not have protruding portion 141, it is necessary to provide stator core 110 with an engaging portion such as a groove that engages insulator 140 in order to secure insulator 140. In a case where such a groove is provided, a crack may occur at the portion, or the core has a reduced width and a magnetic flux is likely to saturate, and thus there is concern that output of the rotating electric machine may be affected. In contrast, in a case where protruding portion 141 as described above is provided, there is no need to provide a groove or the like in stator core 110, suppressing a crack in the core, reduction in core width, and the like. Further, since insulator 140 presses terminal module 1 from above, uplift of terminal module 1 can be prevented.

Although FIG. 9 shows that two protruding portions 141 are provided to each of the first V-phase coil 11V and the first W-phase coil 11W only, a cassette coil provided with protruding portion 141 is changed as appropriate. Typically, all of the cassette coils are provided with protruding portions 141. Each cassette coil may be provided with only one protruding portion 141, or three or more protruding portions 141.

Figure 11:
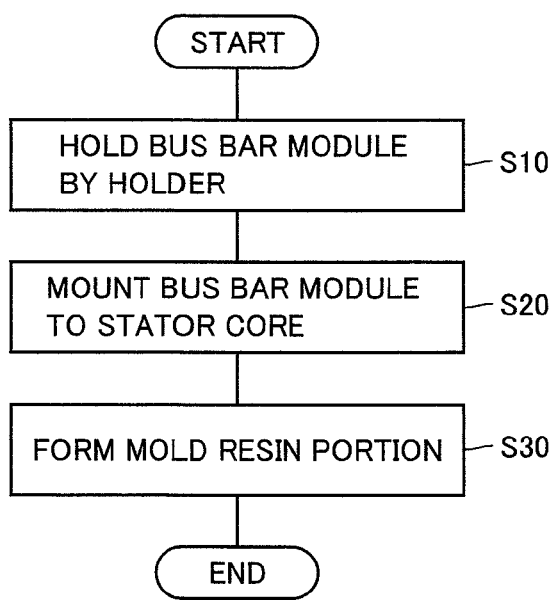
FIG. 11 is a flowchart illustrating a method of manufacturing a rotating electric machine in accordance with one embodiment of the present invention.

Next, a method of manufacturing stator 10 in accordance with the present embodiment will be described with reference to FIG. 11. As shown in FIG. 11, the method of manufacturing stator 10 includes the steps of holding terminal module 1 (bus bar module) by a holder (S10), mounting terminal module 1 held by the holder to stator core 110 (S20), and forming mold resin portion 120 by resin molding terminal module 1 mounted to stator core 110 (S30).

When terminal module 1 is held by the holder in S10, the guide pin of the holder is inserted into phase determining hole 102 formed in terminal module 1, and thereby the phase of rotation of terminal module 1 about an axial direction is determined. By determining the phase of rotation of terminal module 1 about the axial direction using phase determining hole 102 as described above, terminal module 1 can be automatically mounted to stator core 110.

Further, when terminal module 1 is resin molded in S30, the guide pin of the mold for mold resin portion 120 is inserted into position determining hole 131 formed in terminal module 1, and thereby the position of the mold is determined. By determining the position of the mold for resin molding using position determining hole 131 as described above, the mold can be automatically mounted.

As has been described above, according to terminal module 1 in accordance with the present embodiment, a phase of rotation of rail 100 can be determined by inserting the guide pin of the holder into phase determining hole 102, and thus terminal module 1 can be automatically mounted to stator core 110.

Further, since phase determining hole 102 can be formed effectively using a space in rail 100 where the first to fourth bus bars 11 to 13, 21 to 23, 31 to 34, and 41 are not formed, size reduction of terminal module 1 is not inhibited.

Furthermore, since the position of the mold can be determined by inserting the guide pin of the mold into position determining hole 131, the mold can be automatically mounted.

Further, according to stator 10 in accordance with the present embodiment, engagement between insulator 140 and terminal module 1 can secure insulator 140 and the first to fourth U-phase coils 11U to 14U, the first to fourth V-phase coils 11V to 14V, and the first to fourth W-phase coils 11W to 14W wound around insulator 140.

The above description will be summarized below. Specifically, terminal module 1 for a rotating electric machine in accordance with the present embodiment includes rail 100 as a ring-shaped "bus bar housing" having grooves 100A to 100D extending in a circumferential direction, the first to fourth bus bars 11 to 13, 21 to 23, 31 to 34, 41 fitted into grooves 100A to 100D, and connector portion 130 having connector terminals 130U, 130V, 130W connecting the bus bars with an external wire. Rail 100 has phase determining hole 102 for determining a phase of rotation of rail 100 about an axial direction, and connector portion 130 has position determining hole 131 for determining a position of a mold for mold resin portion 120 molding rail 100. Phase determining hole 102 and position determining hole 131 each configure a "guide portion" fitting to a guide pin.

In terminal module 1, the first to fourth bus bars 11 to 13, 21 to 23, 31 to 34, 41 are provided to be arranged in a radial direction of rail 100. Phase determining hole 102 is provided at a position where all of the first to fourth bus bars 11 to 13, 21 to 23, 31 to 34, 41 are divided in the circumferential direction of rail 100.

Further, in terminal module 1, phase determining hole 102 is provided between the third bus bars 32, 33 configuring neutral points of the rotating electric machine.

Stator 10 in accordance with the present embodiment includes stator core 110 having a tooth, insulator 140 fitted to the tooth, the first to fourth U-phase coils 11U to 14U, the first to fourth V-phase coils 11V to 14V, the first to fourth W-phase coils 11W to 14W as the "stator coils" wound around insulator 140, and terminal module 1. Insulator 140 has protruding portion 141 as an "engaging portion" engaging terminal module 1.

Although the embodiment of the present invention has been described, it should be understood that the embodiment disclosed herein is illustrative and non-restrictive in every respect. The scope of the present invention is defined by the scope of the claims, and is intended to include any modifications within the scope and meaning equivalent to the scope of the claims.

Industrial Applicability

The present invention is applicable, for example, to a terminal module for a rotating electric machine having a bus bar, a rotating electric machine having the terminal module, and a manufacturing method thereof.

The invention claimed is:

1. A terminal module for a rotating electric machine mounted on an end surface in an axial direction of a stator of the rotating electric machine, comprising:
    a ring-shaped bus bar housing having a groove extending in a circumferential direction;
    a bus bar fitted into said groove; and
    a connector portion having a terminal connecting said bus bar with an external wire,
    said connector portion having a guide portion for determining a position of a mold for a mold resin portion molding said bus bar housing,
    wherein the guide portion comprises a position determining hole formed in the connector portion for receiving a guide pin formed in the mold.

2. A rotating electric machine, comprising:
    a stator core having a tooth;
    an insulator fitted to said tooth;
    a stator coil wound around said insulator; and
    the terminal module for the rotating electric machine according to claim 1,
    said insulator having an engaging portion engaging said terminal module for the rotating electric machine.

3. A method of manufacturing a rotating electric machine, comprising the steps of:
    holding a ring-shaped terminal module for the rotating electric machine by a holder;
    mounting said terminal module held by said holder to a stator core; and
    determining a position of a mold for resin molding by inserting a guide pin of the mold into a position determining hole formed in said terminal module, and resin molding said terminal module mounted to said stator core using the mold.

4. A terminal module for a rotating electric machine mounted on an end surface in an axial direction of a stator of the rotating electric machine, comprising:
    a ring-shaped bus bar housing having a groove extending in a circumferential direction;
    a bus bar fitted into said groove; and
    a connector portion having a terminal connecting said bus bar with an external wire,
    said connector portion having a guide portion for determining a position of a mold for a mold resin portion molding said bus bar housing,
    wherein the guide portion comprises a projection formed on the connector portion for inserting into a recess formed in the mold.

* * * * *